United States Patent [19]

Cross et al.

[11] Patent Number: 4,770,478
[45] Date of Patent: Sep. 13, 1988

[54] SPECTRALLY SELECTIVE SHUTTER MECHANISM

[75] Inventors: Edward F. Cross, Los Angeles; Gary D. Wiemokly, Sepulveda, both of Calif.

[73] Assignee: The Aerospace Corporation, El Segundo, Calif.

[21] Appl. No.: 897,957

[22] Filed: Aug. 19, 1986

[51] Int. Cl.$^4$ .......................... G02B 5/22; G02B 26/04
[52] U.S. Cl. ...................................... 350/1.6; 350/6.2; 350/6.4; 350/163; 350/315
[58] Field of Search ................ 350/1.6, 173, 275, 163, 350/6.2, 6.4, 286, 315; 250/232, 236, 233

[56] References Cited

PUBLICATIONS

Cross et al., "A Spectrally Selective Shutter Mechanism", S.P.I.E. Proceedings, Aug. 1984.
Cross et al., "A Spectrally Selective Shutter in Proximity to Focal Plane", S.P.I.E. Proceedings, vol. 572, Aug. 20-21, 1985, pp. 182-189.

*Primary Examiner*—Bruce Y. Arnold
*Assistant Examiner*—Terry S. Callaghan
*Attorney, Agent, or Firm*—William J. Burke

[57] ABSTRACT

A repetitive spectrally selective shutter apparatus which has a filter assembly in the space between a set of optics and the resultant focal plane is disclosed. The filter assembly consists of a narrowband filter mounted at an angle between the faces of two juxtaposed wedge-shaped faceplates. When rotated, this apparatus provides repetitive open periods in the narrow spectral bandpass as a function of the speed at which the filter assembly is rotated.

4 Claims, 1 Drawing Sheet

SPECTRALLY SELECTIVE SHUTTER MECHANISM

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

The invention relates to narrowband filters and, in particular, to a means for providing high speed filtered shuttering for large aperture optics.

2. Background

There is a need for an inexpensive, fast, versatile and reliable shutter mechanism that can provide blur-free imagery of rapidly changing scenes across the visible and infrared portion of the spectrum for large aperture optics, including state-of-the-art detection and image systems with large optical apertures. This shuttering action is necessary in many instances to increase signal-to-background ratio of pulsating irradiance levels, obtain blur-free imagery of high-speed, low-retention imagery, provide single-event observations and produce flexible intensity control on incoming radiation. Systems with large optical apertures like telescopes present particular problems because performing shuttering outside the optics requires large filters which are difficult to construct and operate.

It is known in the art that it is advantageous to provide the shuttering for such systems between the optics and the focal plane in order to reduce the shutter size and complexity. However, none of the prior art mechanisms can simply satisfy this requirement for repetitive, high-speed shuttering between the optics and the focal plane. The most common prior art mechanism used for this purpose is a rotating chopper wheel that is installed close to the focal plane and "sweeps" or "wipes" across the image plane. The chopper wheel has several disadvantages. One disadvantage is that a fully open aperture occurs at only one instant of time. Since the chopper wheel is continually masking different segments of the focal plane, video signals from rapidly moving targets and radiant intensity levels vary with both target position and movement on the image plane during open-aperture sweep times. Another important disadvantage of the chopper wheel is that it is difficult to construct a chopper wheel which produces very rapid shuttering, e.g. sub-millisecond shuttering, for large focal planes.

Sub-millisecond shuttering can be achieved by the use of long focal-length optics and mechanical chopping where image irradiance converges to a point in front of the focal plane. However, this approach is not compatible with short focal-length, high-speed optics because the location, alignment, and size of the chopper aperture become exceedingly critical. Any slight change in target position during open-aperture period results in a change in image signal irradiance, which could vary on a frame-by-frame basis.

Conventional shutter systems have been adapted to large aperture optics using additional lens systems to decrease image plane size for faster shuttering speeds and then to redefine the original imagery onto the focal plane. For example, a typical chopper wheel assembly may have the telescope imagery prefocused and demagnified in the chopper aperture plane and then use subsequent optics to reform the image onto the focal plane. Other interactions of this concept have been devised to setup choppers, rotating mirrors, planner shutter, and vibrating reflectors between optics and focal plane. Unfortunately, these opto-mechanical techniques do not eliminate the sweeping shutter effect and they are not easily applicable to a wide range of optical systems. In addition, the conventional electro-mechanical approaches must be tailored for each specific optical application. Furthermore, it becomes difficult and expensive to implement at infrared wavelengths where diffraction effects may result in deteriorated optical resolution.

Other conventional shutter systems cannot be relocated to the space between the optics and the focal plane. In a related invention entitled "A Spectrally Selective Shutter Mechanism", disclosed in August 1984 Proceedings of S.P.I.E., the relative movement of two narrowband spectral filters is used to limit transmitted irradiance. However, at least one of those filters must be installed in front of the optical system and the diameter of that filter must be larger than the diameter of the aperture of the optics. For apertures greater than about 4 inches, the size of the outside filter and the size and speed of the motor to rotate the filter make the use of such a mechanism impractical because it becomes progressively more difficult to fabricate high quality, large area spectral filters and to design the required fast, high torque tilting apparatus.

A final, conventional shuttering mechanism which is placed between the optics and the focal plane is the microchannel plate. This mechanism consists of microscopic metal capillaries connected to a phosphorous plate. The capillaries are connected to a high voltage and transfer the incoming irradiance to an electron field which amplifies the signal onto the phosphorous plate. Shuttering is performed by controlling the application of the voltage. Microchannel plates have several disadvantages. One is that operation is limited to a specific wavelength region. Another is that use of microchannel plates is accompanied by unwanted noise.

It is therefore an object of this invention to provide a fast and reliable shutter mechanism which produces distortion free imagery of rapidly changing scenes for large aperture optics.

It is also an object of this invention to provide a shutter mechanism which is capable of performing in the sub-millisecond range.

It is a further object of this invention to provide a versatile shutter that can operate in the visible and infrared spectral regions.

It is a further object of this invention to provide a shutter mechanism capable of performing at very low f-numbers without a complex arrangements of optical elements.

Yet another object of this invention is to furnish a mechanism for tailoring spectral characteristics of existing narrow-band filters.

SUMMARY OF THE INVENTION

A spectrally selective shutter mechanism has been devised that operates close to the focal plane. The primary feature of this novel mechanism is a filter assembly which consists of a pair of wedge-shaped corrector faceplates that surround a tilted filter. The faceplates act to maintain the optical system resolution while providing angular uniformity for focused irradiance in the spectral bandpass of the open shutter. Since the filter assembly is installed in front of the focal plane, the drive systems and size of the tilted filter can be made compact with standard components.

As the filter assembly is rotated to the open shutter position, focused irradiance is refracted to a narrow angular range inside the filter assembly. The corrector faceplates increase the attenuation of incident rays when the faceplates are rotated to approach a closed shutter angle. The faceplates thus maintain approximately the same level of optical resolution as exhibited without incorporation of the spectral filter.

With this mechanism, filter size is no longer determined by aperture diameter, but by image plane dimension. This smaller and lighter revolving filter assembly makes it easier to build a reliable electro-mechanical drive for fast shutter rates.

DETAILED DESCRIPTION OF THE INVENTION

The shutter described herein uses a rotating narrowband filter set in front of the focal plane to provide repetitive open periods in the sub-millisecond range. This mechanism is the subject of a paper presented to the S.P.I.E. on Aug. 20, 1985 and published in those proceedings. This type of shutter performance is based on two physical principles:

1. When light, optically collected within a known half-cone angle ($\phi_1$) within a material of refractive index $n_1$, passes through a material with a refractive index of $n_2$, the resulting half-cone angle ($\phi_2$) within the second material is sinusoidally decreased according to Snell's Law ($n_1 \sin \phi_1 = n_2 \sin \phi_2$). Thus, as the refractive indice $n_2$ increases, the half-cone angle $\phi_2$ becomes smaller.

2. Increasing the tilt angle ($\theta$) between a narrowband interference filter and the optical focal plane causes the filter bandpass to shift toward shorter wavelengths.

Figure 1:
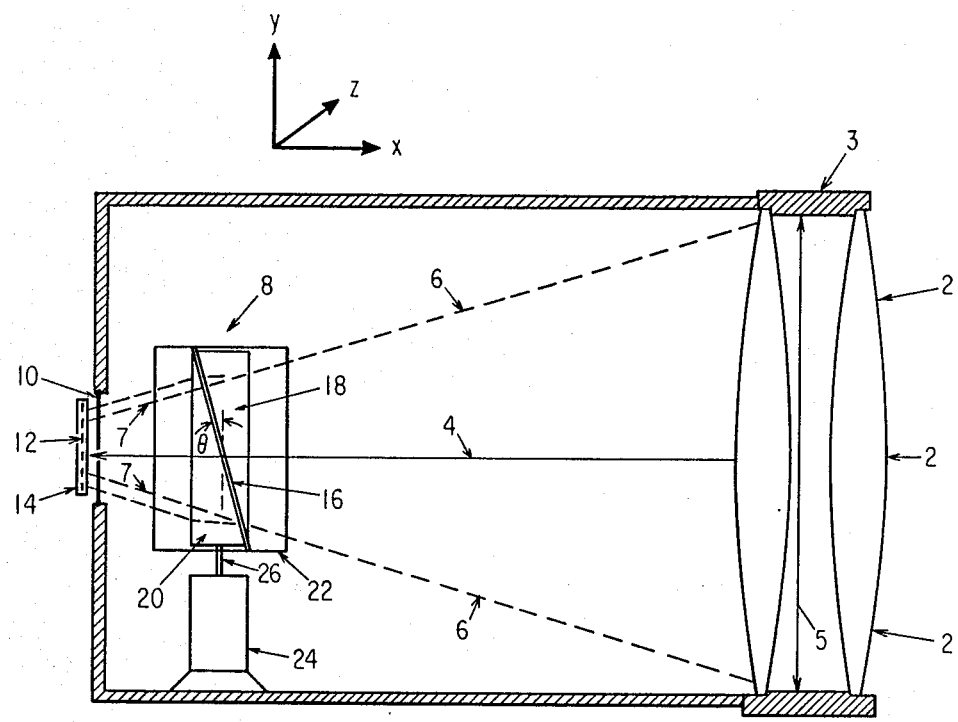
FIG. 1 view of the present invention showing the optics and the filter assembly.

The pertinent components of the present invention are illustrated in FIG. 1. When the shutter is open, light rays 2 in the field of view pass through focusing optics 3. Focusing optics 3 have a focal length 4 and a diameter 5. Rays 2 trace extreme paths 6 through filte assembly 8 and stationary filter 10 to reach focal plane 12 and image sensor 14. The f-number of the focusing optics 3 represents the ratio of the focal length 4 to the diameter 5. Without the filter assembly 8, rays 2 would follow path 7. The filter assembly 8 consists of a narrowband tilted filter 16 mounted between two juxtaposed wedge-shaped optical corrector faceplates, a front corrector faceplate 18 and a rear corrector faceplate 20. The pair of corrector faceplates 18, 20 provides an initial fixed tilt $\theta$ in the x-y plane for the rotating filter 16. Optical baffles 22 are attached to the vertical outside faces of faceplates 18, 20 and the baffles 22 extend forward and rear of filter assembly 8. Drive motor 24 rotates the filter assembly 8 through the x-z plane by means of shaft 26. The shutter is thus open when x-z rotation is 0 degrees and 180 degrees.

The corrector faceplates 18, 20 are fabricated from highly refractive material. In the visible region, quartz would be suitable. In the infrared region, silicon or germanium could be used. In any case, the faceplates do not affect the dimensions or the fixed angular tilt of the rotating filter $\theta$. In effect, the faceplates 18, 20 decrease the cone angle of collected irradiance that is presented to the tilted filter 16 when the shutter is open.

Figure 2:
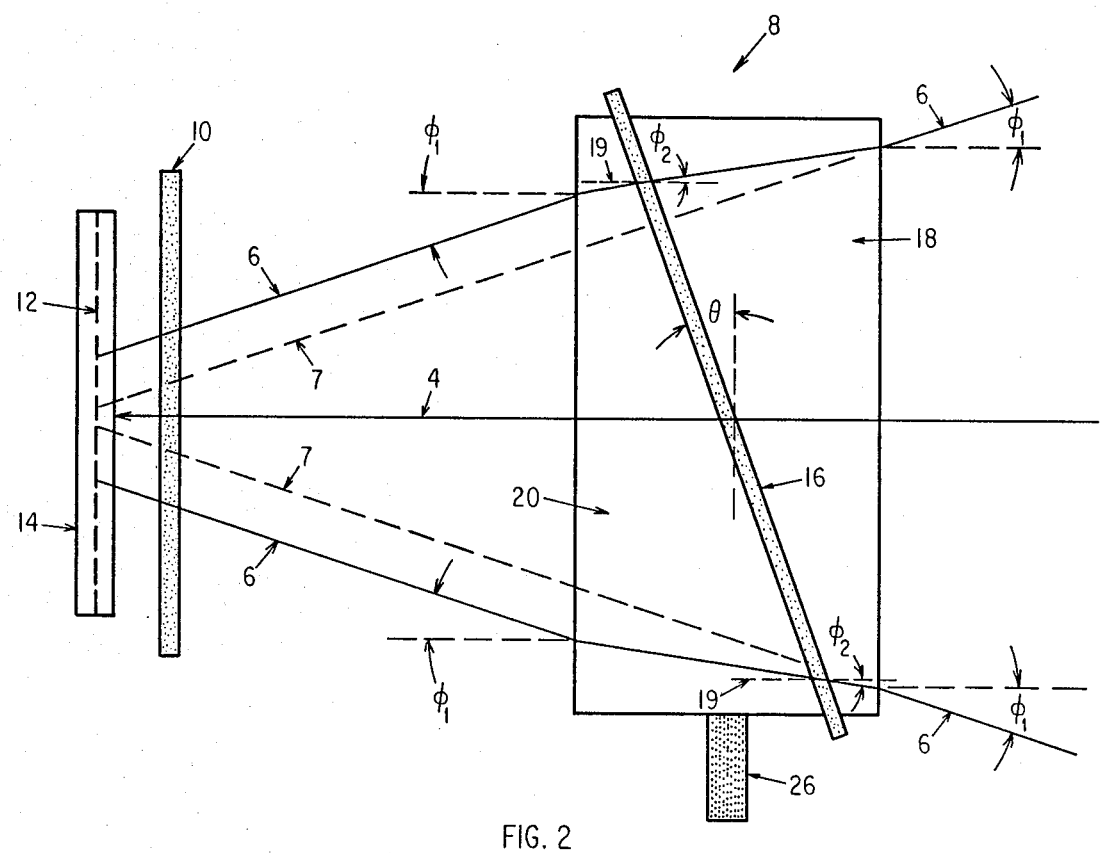
FIG. 2 is a detailed section view of the filter assembly.

A more detailed diagram of the filter assembly 8 is shown in FIG. 2. Extreme light rays 6 form a half-cone which is $\phi_1$ degrees from the optical axis. The f-number which corresponds to a particular angle $\phi$ can be found from the following formula: $\tan \phi = 1/(2(\text{f-number}))$.

Rays 6 are refracted along path 6 by corrector faceplate 18 according to Snell's law ($n_1 \sin \phi_1 = n_2 \sin \phi_2$) to form a half-cone which is $\phi_2$ degrees from the optical axis 19 within the material. The refracted rays pass through tilted filter 16 and corrector faceplate 20 and are reciprocally refracted along path 6 when they exit corrector faceplate 20. The exiting rays again form a half-cone $\phi_1$ degrees from the optical axis.

Optimum spectral definition is achieved when the rays striking the tilted filter 16 within the assembly 8 are as close to parallel as possible. Imaging optics with a large f-number (e.g., greater than an f-number of 4) may be used to produce rays that are more parallel, thereby reducing angle $\phi_2$ and improving spectral definition. Another means to minimize $\phi_2$ in Snell's Law is to increase $n_2$ (e.g., above 2.5 in the visible portion of the spectrum and above 3.4 in the infrared portion of the spectrum) and thereby enhance the refractive effect of the corrector faceplate 18. When the shutter is in the open position, the spectral characteristics (e.g., center wavelength, bandwidth) of the stationary filter 10 coincide with the spectral characteristics of the tilted filter 16.

When this assembly rotates about the axis 26 as shown in FIG. 1, the spectral bandpass of filter 16 shifts out of coincidence with the stationary filter 10. The changing spectral characteristics of rotating filter 16 produces an overall spectral transmission change for the two filters 10 and 16. Thus, the transmission efficiency changes very rapidly, much like a mechanical shutter. When the transmission of filters 10 and 16 in FIG. 1 do not overlap due to rotation of filter 16, the shutter assembly is said to be in the closed position.

As the filter assembly rotates about axis 26, the filter face dimensions are not capable of maintaining total coverage of the optical acceptance cone (as defined by the optical "f" number of the focusing optics 3). Thus, even though spectral transmission is minimal through filter 10 and filter 16, focused irradiance can almost bypass the rotating assembly 8 as the angular position approaches 90 degrees. To prevent this result, the baffles 22, as shown in FIG. 1, block the open areas created by the angular displacement of the rotating filter 16. The baffles consist of a cylindrical tube installed around the filter assembly 8 which extends parallel to the optical axia. Tube length is determined by the extreme rays of the optical acceptance cone for the filter 8 in the open rotational position. As a general rule, tube length is approximately 25 percent larger than the diameter of the filter assembly.

In one embodiment of the mechanism, the f-number is set at 1.5 and angle $\phi_1$ is 18.4 degrees. The fixed angular tilt $\theta$ is set at 20 degrees by a pair of 3.80 cm by 3.80 cm corrector faceplates fabricated of BK-6 glass having a refractive index n of 2.0. The stationary filter has a 0.5964-$\mu$m center wavelength ($\lambda_0$), a 0.0093-$\mu$m bandwidth ($\Delta\lambda$), and a 63.9% peak transmission efficiency ($T_{eff}$). The tilted filter has a $\lambda_0$, $\Delta\lambda$, and $T_{eff}$ of 0.6116

μm, 0.0094 μm, and 60.2%, respectively. When the filter assembly 8 is rotated at one-half the conventional interlaced television rate (30 revolutions per second), open shutter time is 3.50 msec. The image seen through the shutter assembly is complete during all open shutter times since there is no wiping or sweeping which causes the signal to increase and decrease. The image signal is completely controlled by tilted filter and its rotation.

The spectral shuttering mechanism described here can repetitively provide open-shutter times in the 1 to 4-msec range at television rates, which is attainable with the current state of the art. If, however, the narrowband filters were tailored specifically for this purpose, further improvement in shutter speed, transmission efficiency and spectral characteristics could be realized.

This invention could be used in conjunction with large aperture optical devices like telescopes to monitor explosive detonation, high-velocity collisions or targets rapidly traversing the optical field of view. In addition, the invention has applications in conjunction with devices used to observe flow visualization and chemiluminescense phenomena in laser research studies. Possible space applications of this technique involve the recognition and tracking of targets that fluctuate very rapidly in location and intensity. Also, an image system with this high-speed synchronous shuttering could be set up to monitor and track targets irradiated with a pulsed laser beam.

Because the shuttering action is accomplished by varying spectral characteristics of one or two bandpass filters, scene irradiance at the focal plane has a higher wavelength selectivity than is exhibited by either filter individually. As a consequence, integration of both signal and background irradiance is confined to open-shutter times and the narrowed spectral band. Specifically, both these features could be useful in the design of an image system for viewing pulsed laser energy. For such an application, camera observations could be synchronized with the laser pulse rate, thereby limiting signal irradiance to the laser wavelength while simultaneously eliminating background irradiance in the field of view.

In addition, the invention could be used as a non-rotating filter to rapidly fine-tune the filter to pass different wavelengths. Moreover, it should be clear to one skilled in the art that the invention could be placed outside the space between the optics and focal plane and used independently.

For some applications the continual filter rotation could be replaced by the "butterfly motion" derived from a stepper motor or an equivalent mechanical linkage. In this manner faster shutter speeds could be obtained, but maximum attainable repetition rate would be less than realizable with conventional synchronous motors.

Although the invention has been described in terms of a preferred embodiment, it will be obvious to those skilled in the art that many alterations and modifications may be made without departing from the invention. Accordingly, it is intended that all such alterations and modifications be included within the spirit and scope of the invention as defined by the appended claim.

We claim:

1. An opto-mechanical shutter apparatus, which comprises:
    a front wedge-shaped optical corrector faceplate and a rear wedge-shaped optical corrector faceplate;
    a first narrowband filter, having one face mounted on the slant face of said front faceplate and having the opposite face mounted on the juxtaposed slant face of said rear faceplate;
    a means for rotating said filter and said mounted faceplates along the optical axis between a set of focusing optics and the focal plane of said optics; and
    a second narrowband filter mounted on said optical axis proximate to said focal plane.

2. The apparatus claimed in claim 1 wherein the corrector faceplates are made of a material such as quartz that is highly refractive in the visible spectrum and has high transmission efficiency.

3. The apparatus claimed in claim 1 wherein the corrector faceplates are made of a material such as silicon or germanium which is highly refractive in the infrared spectrum and has high transmission efficiency.

4. The apparatus claimed in claim 1 wherein said rotating means rotates at about 30 revolutions per second.

* * * * *